(12) United States Patent
Gisby et al.

(10) Patent No.: US 8,121,638 B2
(45) Date of Patent: Feb. 21, 2012

(54) SYSTEM AND METHOD FOR SECURITY ON A MOBILE DEVICE USING MULTIPLE COMMUNICATION DOMAINS

(75) Inventors: Douglas Gisby, Redwood City, CA (US); Colin Werner, Kitchener, CA (US); Michael Gray, Montclair, NJ (US); Shen-Yuan (Michael) Yap, Sherman Oaks, CA (US)

(73) Assignees: Research In Motion Limited, Waterloo, Ontario (CA); Ascendent Telecommunications, Inc., Redwood City, CA (US)

( * ) Notice: Subject to any disclaimer, the term of this patent is extended or adjusted under 35 U.S.C. 154(b) by 419 days.

(21) Appl. No.: 12/394,208

(22) Filed: Feb. 27, 2009

(65) Prior Publication Data
US 2010/0222097 A1    Sep. 2, 2010

(51) Int. Cl.
*H04M 1/00* (2006.01)
(52) U.S. Cl. .................. 455/552.1; 455/553.1; 370/329; 370/401
(58) Field of Classification Search ............... 455/552.1, 455/553.1; 370/329, 401
See application file for complete search history.

(56) References Cited

U.S. PATENT DOCUMENTS

| | | | | |
|---|---|---|---|---|
| 7,076,239 B2 * | 7/2006 | Kirkup et al. | ................. | 455/411 |
| 7,502,615 B2 * | 3/2009 | Wilhoite et al. | .............. | 455/442 |
| 7,620,391 B2 * | 11/2009 | Itzkovitz et al. | ............. | 455/416 |
| 7,809,381 B2 * | 10/2010 | Aborn et al. | ............... | 455/456.5 |
| 2005/0083899 A1 | 4/2005 | Babbar et al. | | |
| 2007/0238468 A1 * | 10/2007 | Buckley et al. | ............... | 455/445 |
| 2008/0101293 A1 | 5/2008 | Woo et al. | | |

FOREIGN PATENT DOCUMENTS

EP    0716796 B1    11/1998

OTHER PUBLICATIONS

Cisco Unified Mobility, Release 1.2 Data Sheet "http://www.cisco.com/en/US/prod/collateral/vokesu/ps6788/vcallcon/ps6567/product_data_sheet0900aecd80410f2d.pdf", accessed Apr. 27, 2009.
TalkPlus launches free Palm beta of its revolutionary multiple line service "http://palmloyal.com/addons.php?name=News&file=article&sid=17973", Carl Brooks; dated Aug. 21, 2008.
European Patent Office, Extended European Search Report, issued in respect of European Patent Application No. 09154050.0, dated Aug. 21, 2009.
Matias Erny Reichl Hoffman, Response to Extended European Search Report filed in European Patent Application No. 09154050.0, dated Oct. 21, 2009.

* cited by examiner

*Primary Examiner* — Vibol Tan
(74) *Attorney, Agent, or Firm* — Norton Rose Canada LLP

(57) ABSTRACT

A mobile device and a method for providing security to a mobile device having two or more communication domains is provided. The mobile device receives a communication service request. The communication domain of the communication service request is determined, the request domain being one of the two or more communication domains of the mobile device. A set of applicable restrictions is then determined from a list of communication restrictions comprising restrictions on use of services of the mobile device for each of the two or more communications domains. These applicable restrictions are then applied to the communication service request by the mobile device.

12 Claims, 10 Drawing Sheets

SYSTEM AND METHOD FOR SECURITY ON A MOBILE DEVICE USING MULTIPLE COMMUNICATION DOMAINS

FIELD

The present application relates generally to mobile communication devices and, more particularly, to systems and methods for providing enhanced security to mobile communication devices having multiple available communication domains.

BACKGROUND

Currently, many mobile devices are capable of using a variety of different communication domains to send and receive communications. For example, a mobile device may have the capability to send and receive telephone calls, electronic messages and instant messages, just to name a few. In the case of telephone communications, a mobile device may be capable of making and receiving calls through both a PBX or enterprise domain (possibly administered by the user's place of employment) and through other non-enterprise domain(s), such as a personal cellular service. In such cases, the user of the mobile device can receive calls directed both to their work telephone number and to their other telephone number(s) on the same device. Similarly, the user of the mobile device may, in some circumstances, be able to choose whether an outgoing communication is sent through an enterprise or non-enterprise domain.

As will be understood by those skilled in the relevant arts, once they have been made familiar with this disclosure, communications domains can include both communications protocols and/or specific hardware types or configurations adapted to facilitate communications.

The availability of more than one communication domain on a single device has the potential to cause security issues in certain circumstances. Generally, an enterprise domain will be considered more secure than a cellular telephone company service. An administrator of an enterprise network may wish to restrict certain call features on a mobile device in order to have greater control over how users can employ the more secure enterprise service in conjunction with the less secure non-enterprise service. For example, the administrator may wish to disallow a user from joining a conference call using the enterprise domain and then bridging a third party into the conference call through a less secure cellular telephone service.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
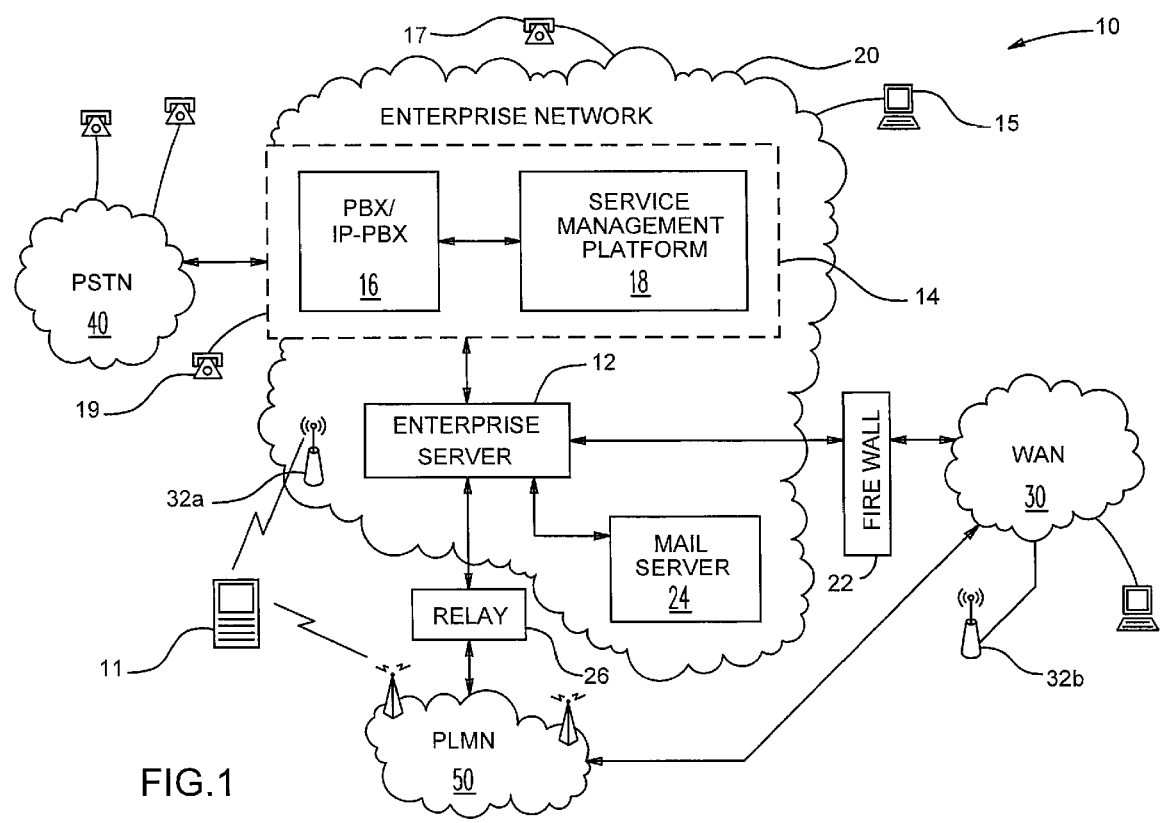
FIG. 1 shows, in block diagram form, an example system for managing enterprise-related mobile calls, including an enterprise communications platform.

In one aspect, there is provided a mobile device configured to accommodate communications in two or more communication domains. The mobile device has a processor for controlling operation of the mobile device, the processor having access to memory comprising a set of stored communication restrictions comprising restrictions on the use of services of the mobile device within at least one of the two or more communication domains. The mobile device also has a communication subsystem for sending and receiving wireless communications and receiving incoming communication requests. The mobile device also has a domain module resident in the memory for execution by the processor, the domain module being configured to determine a request domain of a communication service request, the request domain being one of the two or more communication domains of the mobile device and the communication service request being one of an incoming communication request and a mobile device-initiated communication request and a communication restriction module resident in the memory for execution by the processor, the communication restriction module being configured to determine a set of applicable restrictions from the set of communication restrictions based on the request domain and apply the set of applicable restrictions to the communication service request.

In another aspect, there is provided a method of accommodating communications on a mobile device in two or more communication domains, the method executed by at least one processor on the mobile device. The mobile device comprises a communication subsystem for sending and receiving wireless communications and receiving incoming communication requests. The method comprises: receiving a communication service request at the mobile device; causing execution of a domain module resident in a memory associated with the at least one processor to determine a request domain of the communication service request, the request domain being one of the two or more communication domains of the mobile device and the communication service request being one of an incoming communication request and a mobile device-initiated communication request; and causing execution of a communication restriction module resident in a memory associated with the at least one processor to determine a set of applicable restrictions from a set of communication restrictions comprising restrictions on use of services of the mobile device for each of the two or more communications domains and apply the set of applicable restrictions to the communication service request.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa. The mobile device 11 will be discussed in greater detail in relation to FIG. 6.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch exchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
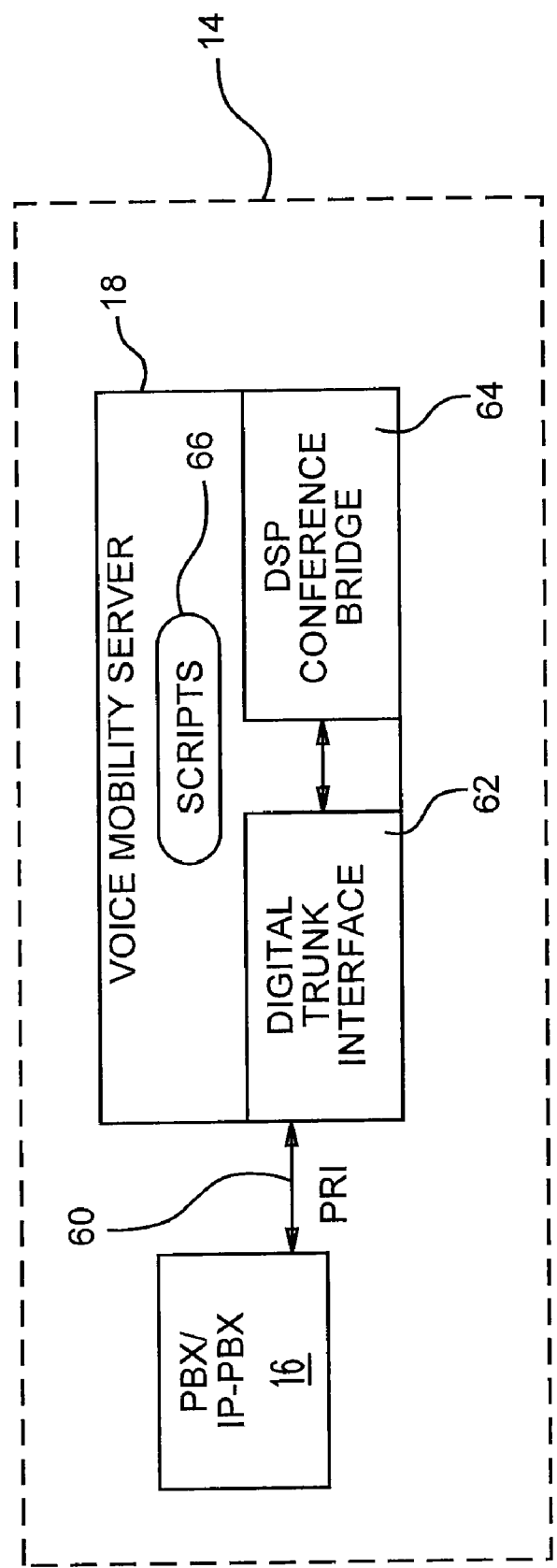
FIG. 2 shows, in block diagram form, further details of an embodiment of the enterprise communications platform.
Figure 3:
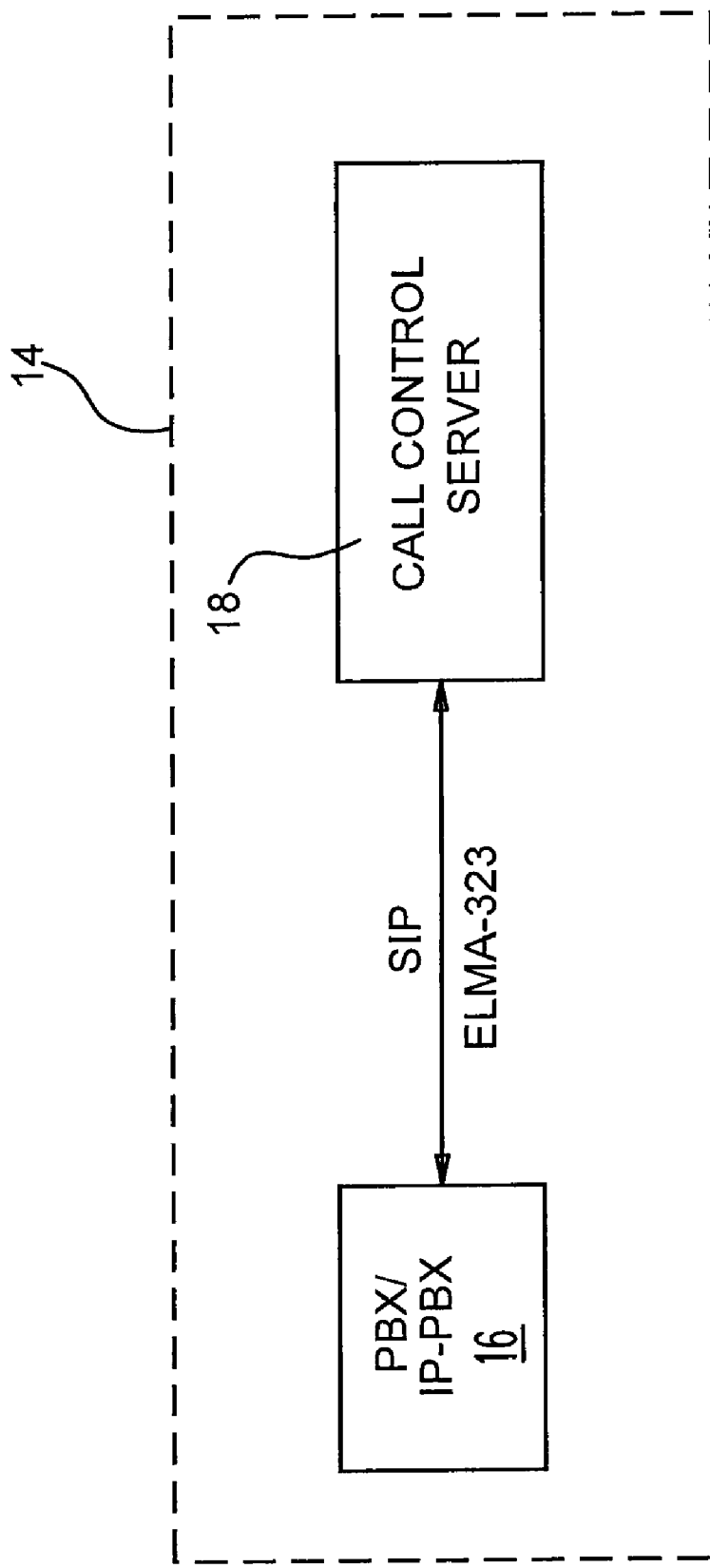
FIG. 3 shows another embodiment of the enterprise communications platform.
Figure 4:
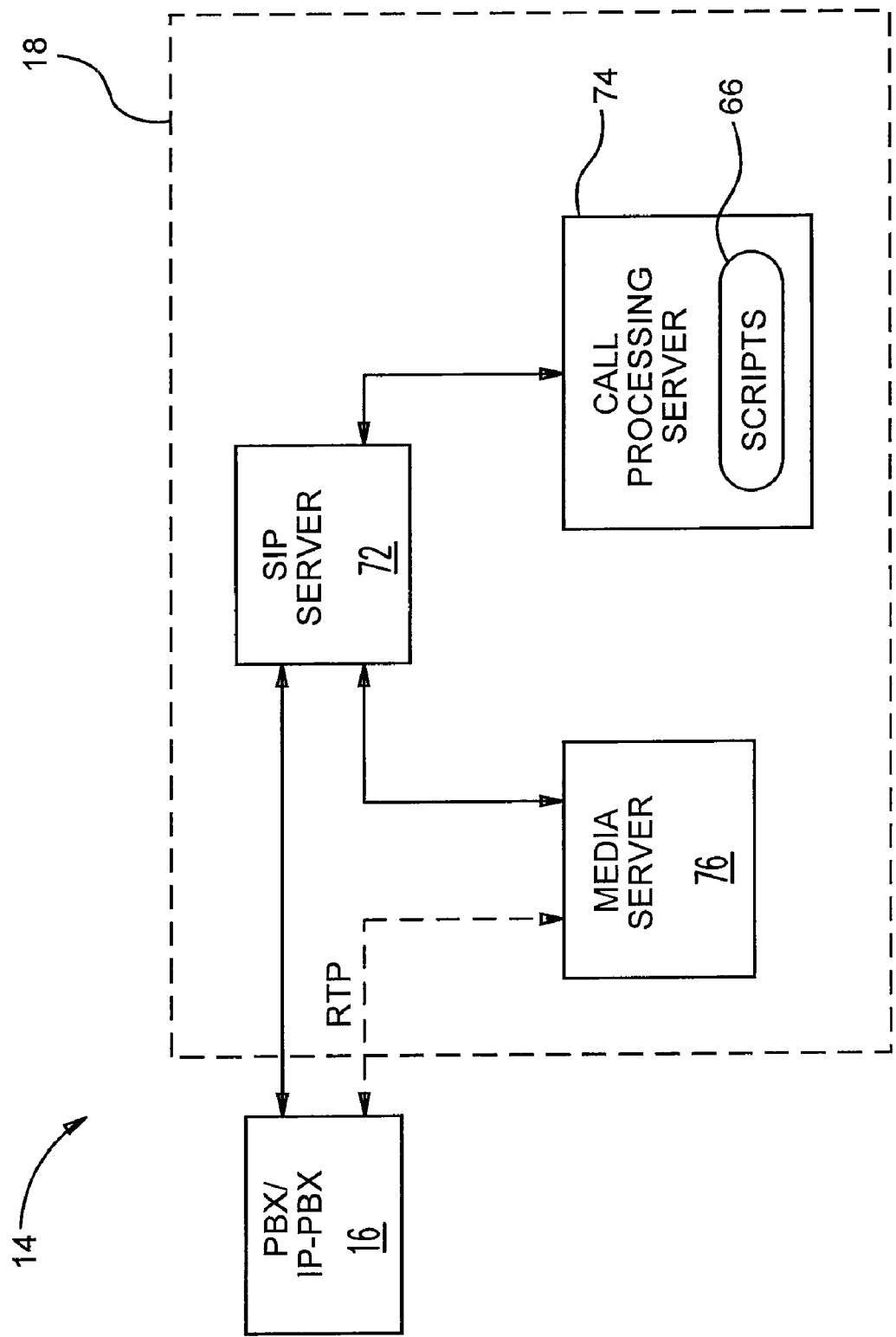
FIG. 4 shows yet another embodiment of the enterprise communications platform.

Reference is now made to FIGS. 2 to 4, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment of the enterprise communications system 14, in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5A:
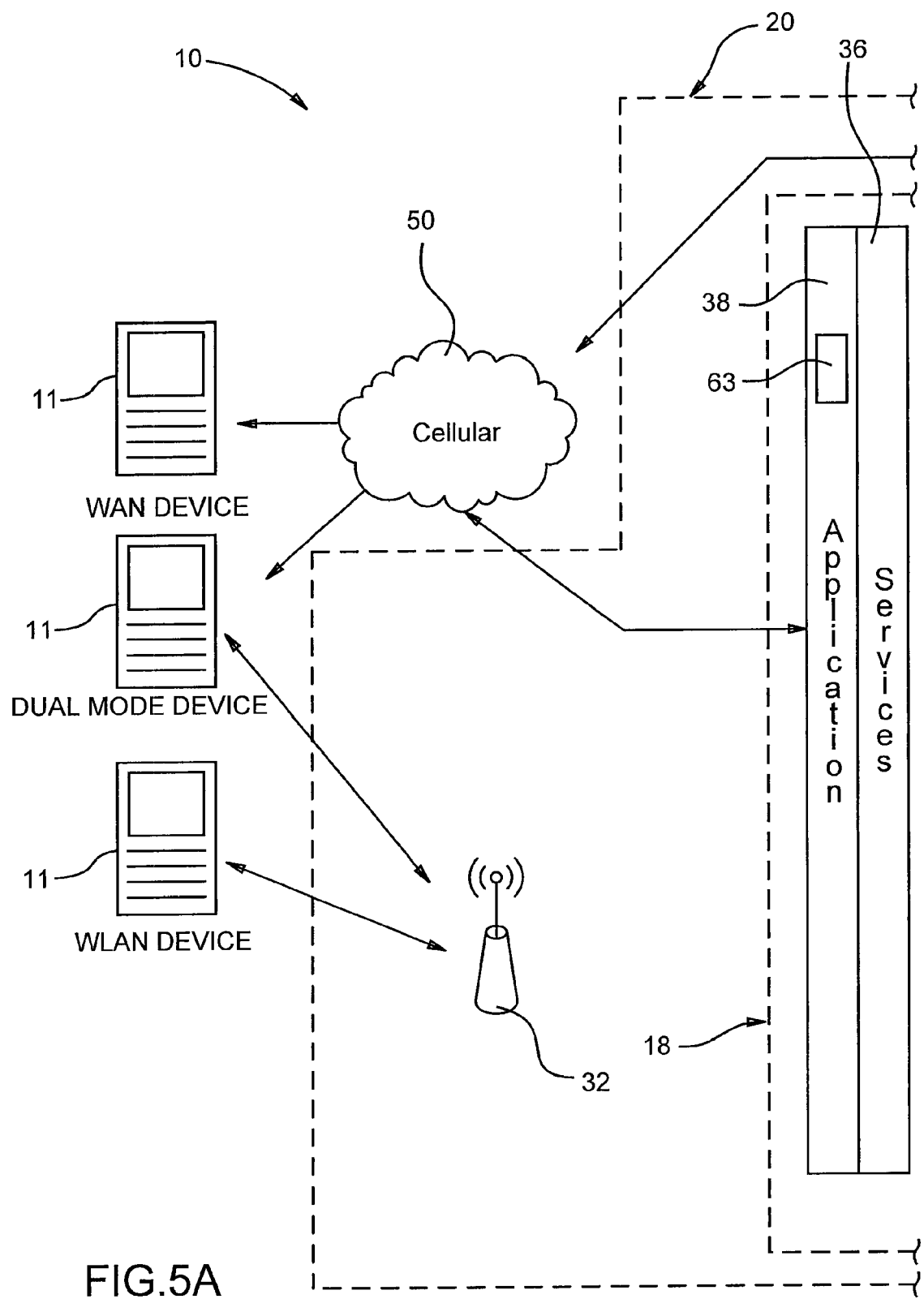
FIGS. 5A and 5B show, in block diagram form, further details of the enterprise communications platform of FIG. 3.
Figure 5B:
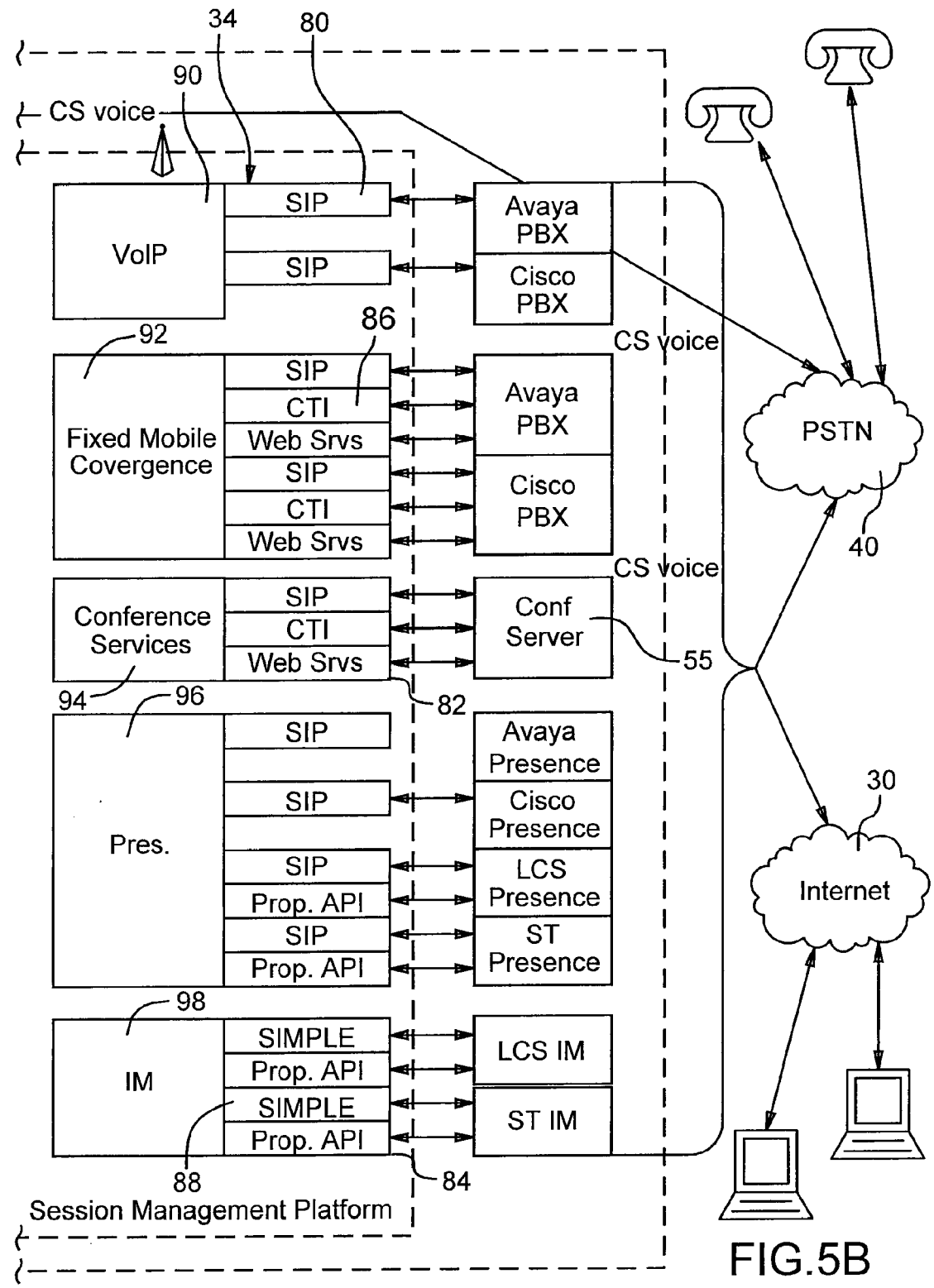

Reference is now made to FIGS. 5A and 5B, collectively referred to as FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application.

For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Figure 6:
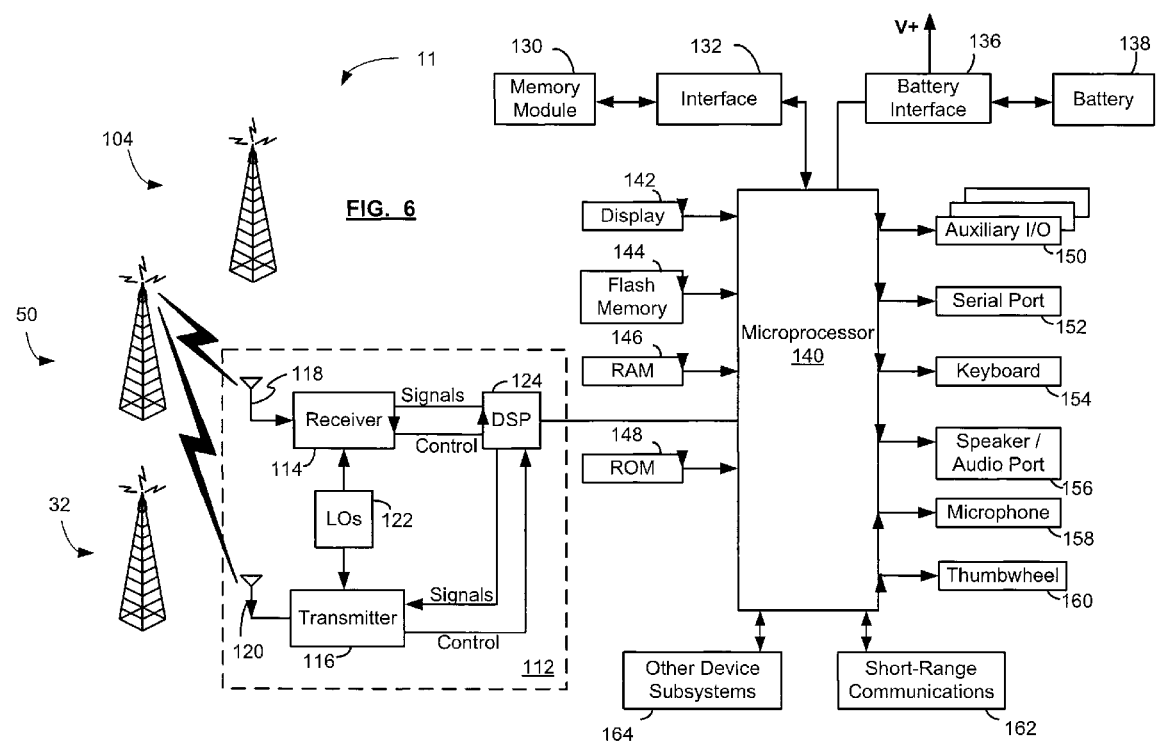
FIG. 6 shows, in block diagram form, a mobile device suitable for use in the system of FIG. 1 in accordance with an embodiment.

Reference is now made to FIG. 6, which shows a block diagram illustrating a mobile device 11 suitable for use in the system 10 described above in relation to FIG. 1.

In some embodiments, the mobile device 11 is a two-way mobile communication device having at least voice and data communication capabilities, including the capability to communicate with other computer systems. Depending on the functionality provided by the mobile device 11, it may be referred to in a variety of ways, including for example as a data messaging device, a two-way pager, a cellular telephone with data messaging capabilities, a wireless Internet appliance, a data communication device (with or without telephony capabilities), a clamshell device, or a flip-phone. The mobile device 11 may communicate with any one of a plurality of fixed transceiver stations within its geographic coverage area.

The mobile device 11 may incorporate a communication subsystem 112, which can include one or more receivers 114, transmitters 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the mobile device 11. As will be apparent to those skilled in the field of communications, the particular design of the communication subsystem 112 depends on the system 10 and the wireless network 104 in which the mobile device 11 is intended to communicate.

The mobile device 11 may send and receive communication signals to and from the enterprise network 20 through the PLMN 50 and/or one or more of the WLANs 32. In some embodiments, the mobile device 11 may also be capable of sending and receiving signals through a wireless communication network 104 without the communication being relayed through the enterprise network 20. For example, where the user of a mobile device 11 has a personal cellular service associated with the mobile device 11, the user may send and receive cellular telephone calls to and from other devices on the wireless network 104 without the use of the enterprise network 20. The wireless network 104 includes antennae, base stations, and supporting radio equipment as for supporting wireless communications between the mobile device 11 and other devices connected to wireless network 104.

Signals received by the antenna 118 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access, for both the enterprise network 20 and the wireless network 104, is associated with a subscriber or user of the mobile device 11 via a memory module, such as a memory module 130, which may be a Subscriber Identity Module (SIM) card for use in for example a GSM network or a Universal Subscriber Identity Module (USIM) card for use in a Universal Mobile Telecommunication System (UMTS). The SIM card is inserted in or connected to an interface 132 of the mobile device 11. Alternatively, the mobile device 11 may have an integrated identity module for use with systems such as Code Division Multiple Access (CDMA) systems.

The mobile device 11 also includes a battery interface 136 for receiving one or more rechargeable batteries 138. The battery 138 provides electrical power to at least some of the electrical circuitry in the mobile device 11, and the battery interface 136 provides a mechanical and electrical connection for the battery 138. The battery interface 136 is coupled to a regulator (not shown) which provides power V+ to the circuitry of the mobile device 11.

The mobile device 11 includes a microprocessor 140 which controls the overall operation of the mobile device 11. Communication functions, including at least data and voice communications, are performed through the communication subsystem 112. The microprocessor 140 also interacts with additional device subsystems such as a display 142, a flash memory 144, a random access memory (RAM) 146, a read-only memory (ROM) 148, auxiliary input/output (I/O) subsystems 150, a data port such as Universal Serial Bus (USB) port 152, a keyboard or keypad 154, a speaker or audio port 156 for connecting to, for example a set of headphones or an earpiece, a microphone 158, a clickable thumbwheel or thumbwheel 160, an open/close sensor 161, a short-range communications subsystem 162, and any other device subsystems generally designated as 164. Some of the subsystems shown in FIG. 6 perform communication-related functions, whereas other subsystems may provide "resident" or on-device functions. Notably, some subsystems, such as the keypad 154, the display 142 and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the mobile device 11. A predetermined set of applications that control basic device operations, including data and voice communication applications, will normally be installed on the mobile device 11 during or after manufacture.

The mobile device 11 may include a personal information manager (PIM) application having the ability to organize and manage data items relating to a user such as, but not limited to, instant messaging, email, calendar events, voice mails, appointments, and task items. One or more memory stores may be available on the mobile device 11 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications have the ability to send and receive data items via the PLMN 50, one of the WLANs 32 and/or the wireless network 104 or via a link to a computer system. The link to the computer system may be via the serial port 152 or the short-range communications subsystem 162. In an embodiment, PIM and/or media data items are seamlessly combined, synchronized, and updated through the PLMN 50, one of the WLANs 32 and/or the wireless network 104, with the mobile device user's corresponding data items stored and/or associated with a host computer system thereby creating a mirrored or partially mirrored host computer on the mobile device 11 with respect to such items. This may be advantageous where the host computer system is the mobile device user's office computer system. Additional applications may also be loaded onto the mobile device 11 through the PLMN 50, one of the WLANs 32 and/or the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the mobile device 11 and may provide enhanced on-device functions, communication-related functions, or both. For example, secure communication applications may enable electronic commerce functions and other such financial transactions to be performed using the mobile device 11.

In a data communication mode, a received data signal representing information such as a text message, an email message, a media file to be transferred, or Web page download will be processed by the communication subsystem 112 and input to the microprocessor 140. The microprocessor 140 will further process the signal for output to the display 142 or alternatively to the auxiliary I/O device 150. A user of the mobile device 11 may also compose data items, such as email messages, for example, using the keypad 154 and/or the clickable thumbwheel 160 in conjunction with the display 142 and possibly the auxiliary I/O device 150. The keypad 154 maybe either a complete alphanumeric keypad or telephone-type keypad. These composed items may be transmitted through the communication subsystem 112 or via the short range communication subsystem 162.

For voice communications, the overall operation of the mobile device 11 is similar, except that the received signals would be output to the speaker or audio port 156 and signals for transmission would be generated by a transducer such as the microphone 158. Alternative voice or audio I/O subsystems, such as a voice message recording subsystem, may also be implemented on the mobile device 11. Although voice or audio signal output is typically accomplished primarily through the speaker or audio port 156 or the display 142 may also be used to provide an indication of the identity of a calling party, duration of a voice call, or other voice call related information. Stereo headphones or an earpiece may also be used in place of the speaker 156.

The USB port 152 is normally implemented in a personal digital assistant (PDA) type communication device for which synchronization with a user's computer is a desirable, albeit optional, component. The USB port 152 enables a user to set preferences through an external device or software application and extends the capabilities of the mobile device 11 by providing for information or software downloads to the mobile device 11 other than through the PLMN 50, one of the WLANs 32 and/or the wireless network 104. The alternate download path may, for example, be used to load software or data files onto the mobile device 11 through a direct, reliable and trusted connection.

The short-range communications subsystem 162 is an additional optional component which provides for communication between the mobile device 11 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, and/or 802.11n.

While we assume in the following examples that the mobile device 11 has only one enterprise domain and one non-enterprise domain available to it, it should be noted that there may be any number of enterprise and non-enterprise domains available to a particular mobile device 11.

Figure 7:
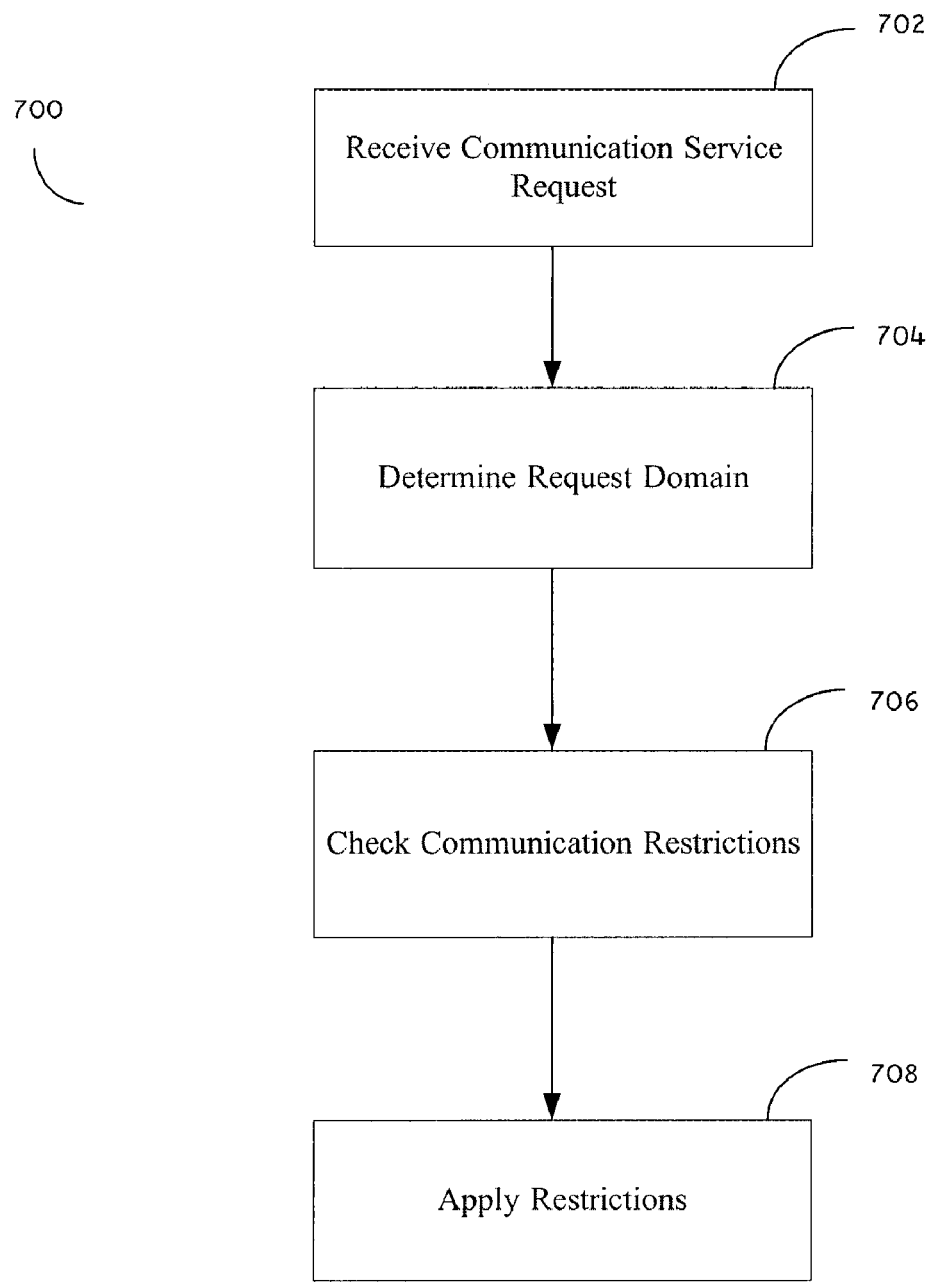
FIG. 7 shows a method of restricting the use of a mobile device having two or more communication domains according to an embodiment.

Reference is now made to FIG. 7, which shows a method 700 of providing security to a mobile device having two or more communication domains according to one embodiment. The method 700 is suitable for use in, for example, the mobile device 11 of FIG. 6. Reference will also be made to FIG. 6 where appropriate.

As mentioned above, communications domains can include, for example, communications protocols and/or specific hardware types or configurations adapted to facilitate communications. For example, a mobile device 11 may have two communication channels available to it, one which is routed through an enterprise network 20 and one which is a cellular service administered by a cellular service provider. Similarly, where communications are received using a Wi-Fi connection, a user may receive a communication through the enterprise network 20, such as through one of the WLANs 32 shown in FIG. 1, or through a personal or publicly available Wi-Fi connection. A communication domain may also relate to a text based communication such as an email. A user may received emails for any number of different email addresses. Each of these email addresses may be received using a different communication domain.

Process 700 can begin at block 702, where a communication service request is received by the mobile device 11. The communication service request could, for example, relate to a voice- or other session-based communication, such as a telephone call or voice mail, or to a text based communication, such as an electronic mail or text message. The communication service request could originate from a user of the mobile device 11, such as, for example, a request to initiate an outgoing communication, a request to forward a communication, a request to join a conference call or a request to join a party to a conference call. A mobile device-initiated request could be received from the user through one or more of the input devices of the mobile device 11, such as keyboard 154, microphone 158 and/or thumbwheel 160. Alternatively, a mobile device-initiated request could originate in the mobile device based on, for example, a pre-defined request or preference.

As another option, the communication service request may originate externally, for example from the enterprise network 20 or a third-party device. Examples of external requests may include, for example, incoming communications such as telephone calls, voice messages, text messages and electronic mail. An incoming request may be received, for example, through the PLMN 50 or wireless network 104 or it may be a Wi-Fi communication received, for example, from one of the WLANs 32 shown in FIG. 1.

At 704, the mobile device 11 determines the communications domain associated with the communication service request, referred to hereafter as the request domain. This may be done, for example, using a domain module resident in a memory of the mobile device 11, such as RAM 146, ROM 148, or flash memory 144, to be executed by a processor, such as microprocessor 140. The way in which the domain is determined may depend on the domains supported by the wireless device as well as on the type of service requested by the communication service request. For example, if the communication service request relates to an incoming communication, the request domain may depend on origin of the request, or on the destination address used by the source of the incoming communication. This will be discussed in greater detail in relation to FIG. 8. If the communication service request relates to a mobile device-initiated service, such as an outgoing telephone call, the request domain may, for example, be set based on one or more rules or be selected by the user. This will be discussed in greater detail in relation to FIG. 9.

At block 706, a list of communication restrictions is checked to determine if one or more of the restrictions may be applicable to the current communication service request. This may be done, for example, using a communication restriction module resident in a memory of the mobile device 11, such as RAM 146, ROM 148, or flash memory 144, to be executed by a processor, such as microprocessor 140. The list of communication restrictions may, for example, be stored as suitably-encoded data records in memory located on or otherwise accessible by the mobile device 11 (such as, for example, ROM 148, RAM 144, or flash memory 144 of the mobile device 11 shown in FIG. 6). The communication restrictions could, for example, be in the form of a spreadsheet or the like, with suitably-encoded items representing various flags and conditions. Each entry in the list could have a restriction, such as a rule or a prohibited circumstance or other condition, and a domain or domains to which the restriction applies. For example, a communication restriction may restrict a conference function of the mobile device such that a user's ability to conference a party into an ongoing conference call through an enterprise network 20 is restricted to only those parties having an enterprise-assigned telephone number.

The restrictions may be specific to the user of the mobile device 11. For example, certain users, as identified by the identifiers such as user identification (UUID) and password provided at log-on, may be restricted from making telephone calls through a non-enterprise domain from the mobile device 11. Other restrictions may be enterprise-wide restrictions (in that they apply to every user connected to a specific enterprise network 20). Where there is more than one enterprise domain available to a mobile device 11, there may be more than one set of enterprise-specific restrictions. For example, a mobile device may have access to four telecommunication domains: Enterprise Domain 1 (Acme Corp), Enterprise Domain 2 (ABC Corp who is a client of Acme Corp), Enterprise Domain 3 (XYZ Corp a client of Acme Corp) and a personal cellular domain. The user may be permitted to connect calls between Enterprise Domain 1 and Enterprise Domain 2 and between Enterprise Domain 1 and Enterprise Domain 3 and not be permitted to connect calls between Enterprise Domain 2 and Enterprise Domain 3 or between any of the enterprise domains and the cellular domain.

Communication restrictions may be created by the user of the mobile device 11 or by an administrator of the enterprise network 20 or some combination of the two. The communication restrictions may also be general restrictions regulated by an external body. For example, certain regions may have restrictions on how emergency telephone calls are routed. It may be required that any emergency telephone call be routed through the cellular telephone service of the mobile device 11 as this domain provides more information to emergency personnel regarding the location of the user of the mobile device 11. Some or all of the communication restrictions may be downloaded to the mobile device 11 from the enterprise network 20.

At block 708, the applicable communication restrictions are applied to the current communication service request. This may, for example, comprise disallowing a communication service request which contravenes one or more of the applicable communication restrictions and possibly sending an error message or taking other steps to inform the user of the mobile device 11 or the source of the communication service request of the disallowed request.

There may also be different priorities associated with the communication restrictions such that, if two restrictions conflict, the higher priority restriction will be applied. For example, there could be a user-specific rule that all outgoing communications must be initiated through the enterprise domain and a service-specific rule that all emergency calls be routed through a non-enterprise domain. In this case, the priority of each of these rules would be established to determine which domain should be used for an outgoing emergency call.

Figure 8:
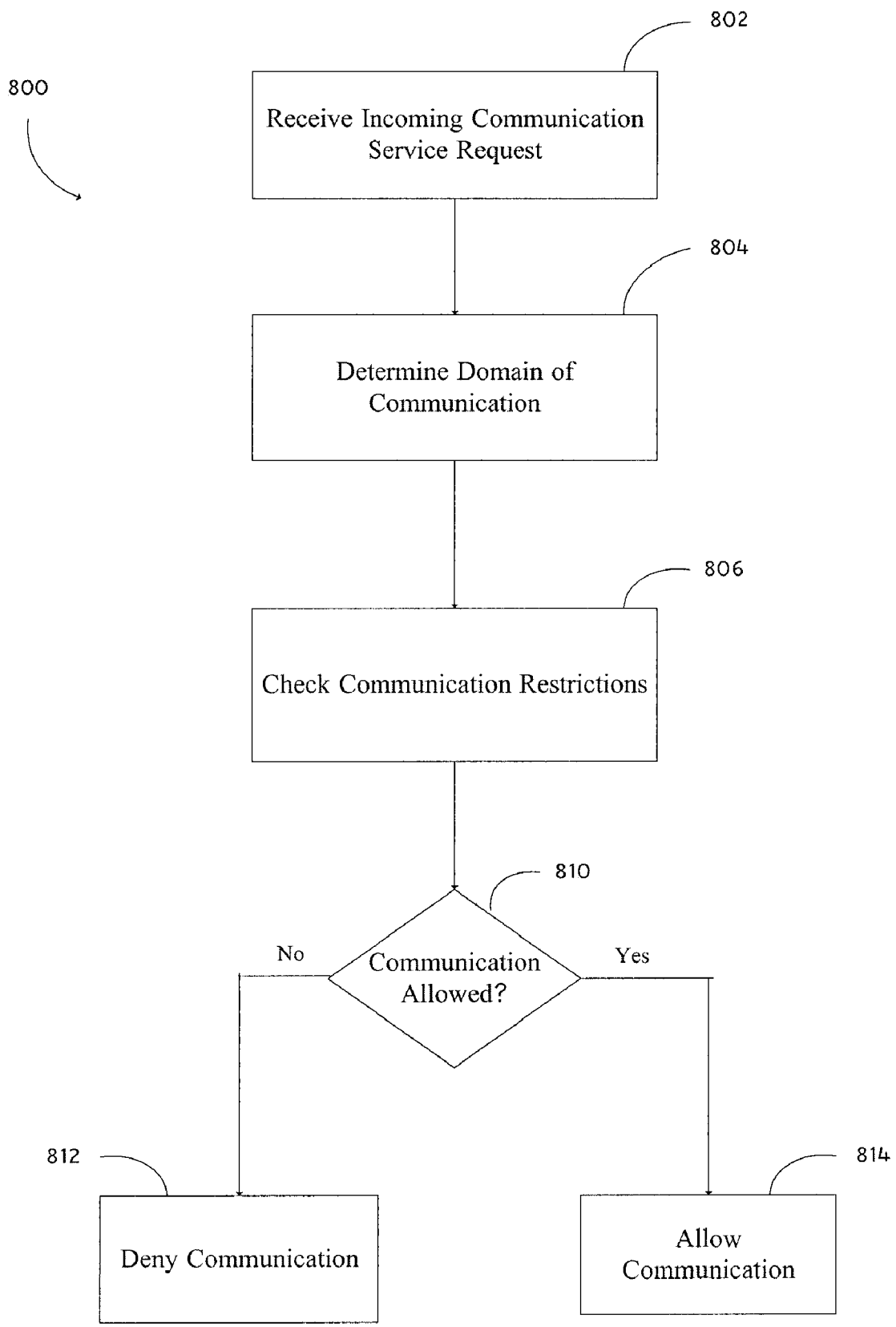
FIG. 8 shows a method of handling an incoming communication according to an embodiment.

Reference is now made to FIG. 8, which shows a method 800 of responding to an incoming communication according to one embodiment. This may be considered a more specific embodiment of method 700 of FIG. 7. Reference will also be made to FIG. 6 where appropriate.

Method 800 can begin at 802, where an incoming communication service request is received by the mobile device 11. The communication may be received through the enterprise network 20 or from a third-party device such as a telephone or computer through, for example, the wireless network 104. The communication could include, for example, a telephone call, a voice mail, an electronic message or a text message.

At block 804, the domain associated with the communication service request (request domain) can be determined. In the case of an incoming communication, determination of the request domain may be based, for example, on the originating or destination address used by the source of the incoming communication. For example, if the mobile device 11 has both an enterprise domain and a non-enterprise telephone domain (such as a personal cellular telephone service), the request domain will depend on whether the initiating party dialed the number for the enterprise service or for the non-enterprise telephone service. Whether a call originates through an enterprise domain or a non-enterprise domain can be determined in a number of ways. For example, information relating to the source of a communication may be sent by an enterprise network 20 to a mobile device 11 when a communication is initiated. This information will also indicate to the mobile device 11 that the communication is through the enterprise domain. It should be noted that other information, such as the type of communication (e.g. conference call) may also be relayed to the mobile device 11.

Similarly, for example, if the mobile device 11 is set up to receive both work-related electronic mail for a work electronic mail address and personal electronic mail from the user's own personal electronic mail address, then the request domain can depend on the email address to which the communication was sent.

At 806 the communication restrictions may be checked to determine if there are any restrictions which would apply to the current situation. For example, if the incoming communication is routed through the enterprise network 20, the communication restrictions may be checked to determine which, if any, of the restrictions apply to the enterprise domain.

At 810, the mobile device 11 can determine whether the communication service request is allowed based on the applicable communications restrictions. If the communication is prohibited based on the applicable communication restrictions, the method 800 moves to block 812 where the communication service request is denied. For example, a communication restriction applicable to the non-enterprise cellular domain may prohibit the user of the mobile device 11 from answering a non-enterprise cellular call while there is an ongoing enterprise call on the same device. In this case, if the communication service request was a non-enterprise cellular call and there was an ongoing enterprise call, the method 800 would move to block 812 where the communication service request may be denied. At block 812, the communication may, for example, be forwarded directly to voice mail or a message may be relayed to the source of the communication indicating that the call can not be allowed at this time, and any proposed communications session discontinued. Information regarding the disallowed communication may also be presented to the user of the mobile device 11 on, for example, the display 142.

If there are no communication restrictions prohibiting the requested communication, control can move to block 814 where the communication is allowed to continue. For example, in the case of a voice communication, this may mean that the mobile device 11 notifies the user of the incoming communication. If the user accepts the incoming communication, a connection may be established between the mobile device 11 and the source of the communication. In the case of an electronic mail message, for example, the message may be routed to the user's inbox.

It should be noted that there may be further restrictions placed on how the user can handle the incoming communication once it has been allowed. For example, the user of the mobile device 11 may be permitted to accept a communication from a non-enterprise domain but may not be permitted to conference or forward the communication to another enterprise user. These latter restrictions would be handled when the conference or forwarding request was received from the user of the mobile device 11.

Figure 9:
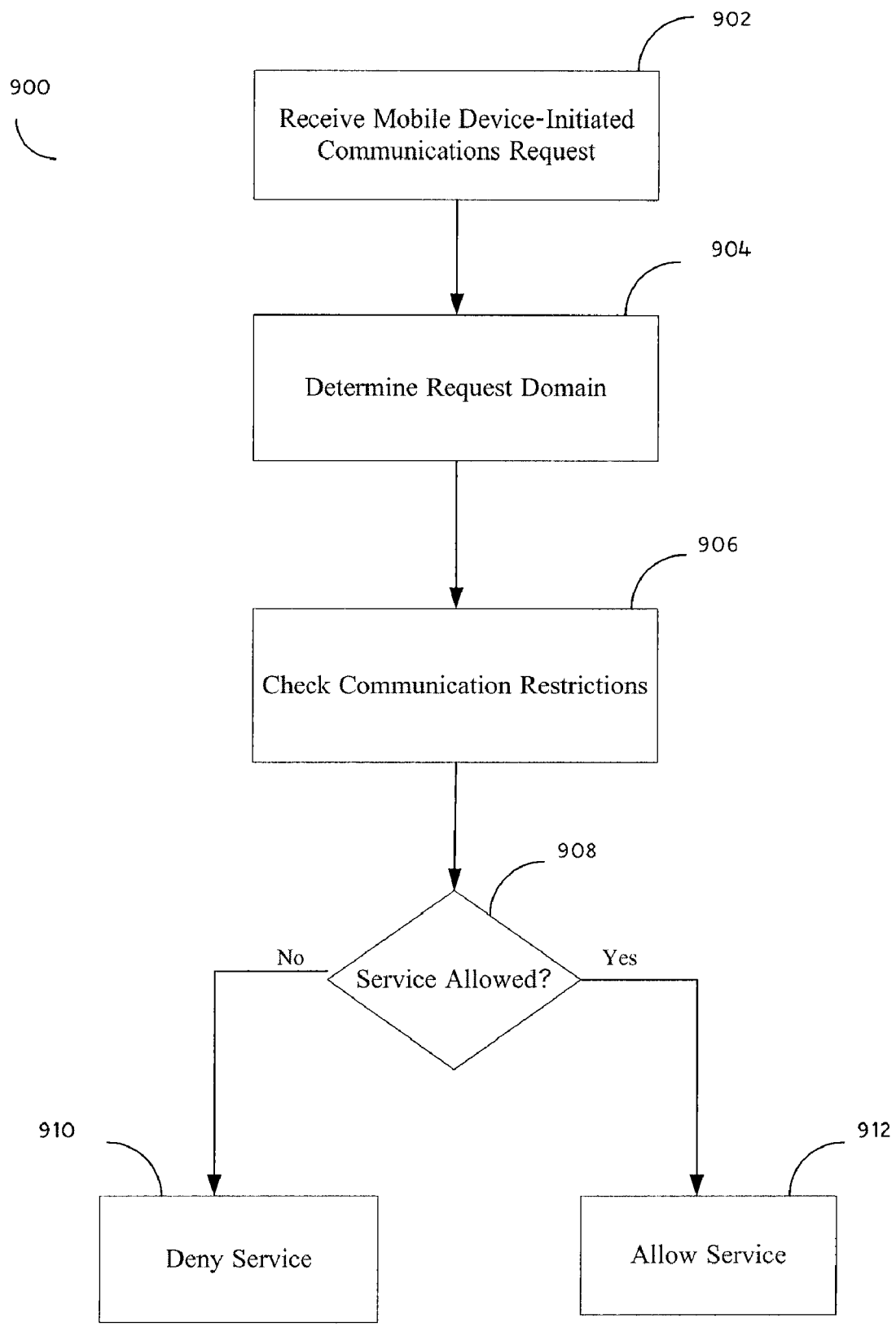
FIG. 9 shows a method of handling a mobile device-initiated communication according to an embodiment.

Reference is now made to FIG. 9, which shows a method 900 of responding to a mobile device-initiated communication according to one embodiment. This may be considered a more specific embodiment of method 700 of FIG. 7. Reference is also made to FIG. 6 where appropriate.

Method 900 can begin at block 902 where a mobile device-initiated service request is received by the mobile device 11. The communication service request could include, for example, a request to initiate an outgoing telephone call, a request to forward a current telephone call, a request to join a conference call, a request to bring another party into an ongoing conference call or a request to send a voice mail, an electronic message or a text message.

At block 904, the domain to be used for the requested communication (request domain) is determined. In the case of a mobile device-initiated communication, the domain of the communication service request may be determined, for example, by the user of the mobile device 11 or the by the mobile device 11 itself according to a set of pre-defined rules. The request domain may be included in the communication service request itself. For example, if the communication service request is an outgoing email, the email address to be used to send the message may be included in the request (i.e.

it may be pre-selected). Similarly, if the service request is a request to forward or conference an external caller where a connection to the mobile device 11 has already been established, the request domain will be determined by the domain from which the external caller is connected to the mobile device.

In some embodiments a list of possible domains may be compiled. The list of possible domains may depend on the service requested. For example, if the service requested is a telephone-based service then the possible domains may include some or all of the telephone domains (e.g. enterprise domains and/or cellular domains). If the service requested is an email-based service then the possible domains may include the various email services available to the user (e.g. work email and/or personal email addresses). The list of possible domains may be further restricted based certain rules, which may, in some circumstances, also be considered communication restrictions. In other words, in some embodiments, communication restrictions may be applied before the domain is chosen to narrow the choice of domains to only those which would be allowable.

If only one possible domain exists for an outgoing communication then this domain will typically be set as the request domain. Otherwise, a choice must be made between the possible communication domains. This choice may be made automatically, for example, according to a set of pre-defined preferences stored in the mobile device 11 or the choice may be made by the user of the mobile device 11. In some embodiments, the user may be presented with a list of domains on, for example, the display 142 of the mobile device 11. The user may then select from this list using one of the input mechanisms provided on the mobile device to set the desired communication domain.

At block 906, the communication restrictions may be checked to determine if there are any restrictions which would apply to the current situation. For example, if the service request involves a communication established through a cellular telephone service, there may be restrictions on how this call is handled if there is already an ongoing communication on the enterprise domain.

At block 908, the mobile device 11 determines whether the communication service request is allowed based on the applicable communication restrictions. For example, the user of the mobile device 11 may not be permitted to forward a call received on their personal cellular telephone account to another number through the enterprise network 20. In this case the method 900 would move to block 910 where the communication service request may be denied. At block 910, the user may be notified that the requested service is unavailable. The notification may include, for example, an explanation as to why the requested service is not allowed at this time.

If there are no communication restrictions prohibiting the requested communication, the method 900 moves to block 912 where the communication is allowed to continue. For example, if the requested communication service were an outgoing telephone call, the mobile device 11 might initiate the call on the domain determined at block 904.

While the blocks of methods 700, 800 and 900 are shown as occurring in a particular order, it will be appreciated by those skilled in the art that many of the blocks are interchangeable and may occur in different orders that that shown without materially affecting the end results of the methods 700, 800 and 900.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

Certain adaptations and modifications of the described embodiments can be made. Therefore, the above discussed embodiments are considered to be illustrative and not restrictive.

What is claimed is:

1. A mobile device configured to accommodate communications in two or more communication domains, the mobile device comprising:
    a processor for controlling operation of the mobile device, the processor having access to memory comprising a set of stored communication restrictions comprising restrictions on the use of services of the mobile device within at least one of the two or more communication domains;
    a communication subsystem for sending and receiving wireless communications and receiving incoming communication requests;
    a domain module resident in the memory for execution by the processor, the domain module being configured to determine a request domain of a communication service request, the request domain being one of the two or more communication domains of the mobile device, and the communication service request being a mobile device-initiated communication request;
    a communication restriction module resident in the memory for execution by the processor, the communication restriction module being configured to determine a set of applicable restrictions from the set of communication restrictions based on the request domain and apply the set of applicable restrictions to the communication service request;
    a display for displaying a subset of the two or more communication domains; and
    one or more input devices for receiving a selection of one of the two or more communication domains in the subset;
    wherein determining the request domain comprises receiving a domain selection from a user of the mobile device.

2. The mobile device of claim 1, wherein the mobile device-initiated communication request is received from the user of the mobile device by the one or more input devices.

3. The mobile device of claim 1, wherein the communication restriction module is further configured to deny the communication service request if the request is contrary to one or more of the one or more communication restrictions and allow the communication service request otherwise.

4. The mobile device of claim 1, wherein the two or more communications domains comprise at least one of: a cellular telephone service, an enterprise network and a Wi-Fi service.

5. The mobile device of claim 1, wherein the subset of the two or more communication domains is selected from the two or more communication domains based on one or more of: user-specific rules, service-specific rules and general rules.

6. The mobile device of claim 1, wherein the request domain is determined based on one or more of: user-specific rules, service-specific rules and general rules.

7. A method of accommodating communications on a mobile device in two or more communication domains, the method executed by at least one processor on the mobile device, the mobile device comprising a communication subsystem for sending and receiving wireless communications and receiving incoming communication requests, the method comprising:

receiving a communication service request at the mobile device;

causing execution of a domain module resident in a memory associated with the at least one processor to determine a request domain of the communication service request, the request domain being one of the two or more communication domains of the mobile device and the communication service request being a mobile device-initiated communication request;

causing execution of a communication restriction module resident in a memory associated with the at least one processor to determine a set of applicable restrictions from a set of communication restrictions comprising restrictions on use of services of the mobile device for each of the two or more communications domains and apply the set of applicable restrictions to the communication service request;

wherein determining the request domain comprises receiving a domain selection from a user of the mobile device; and wherein the domain selection is from a subset of the two or more communication domains.

8. The method of claim 7, wherein the mobile device-initiated communication request is received from the user of the mobile device.

9. The method of claim 7, wherein applying the set of applicable restrictions comprises denying the communication service request if the service is contrary to one or more of the one or more communications restrictions and allowing the communication service request otherwise.

10. The method of claim 7, wherein the two or more communications domains comprise one or more of: a cellular telephone service, an enterprise network and a Wi-Fi service.

11. The method of claim 7, wherein the subset of the two or more communication domains is selected from the two or more communication domains based on one or more of: user-specific rules, service-specific rules and general rules.

12. The method of claim 7, wherein the request domain is determined based on one or more of: user-specific rules, service-specific rules and general rules.

* * * * *